March 27, 1934.  B. E. LUBOSHEZ  1,952,268
PHOTOGRAPHIC OBJECTIVE LENS
Filed Aug. 11, 1930
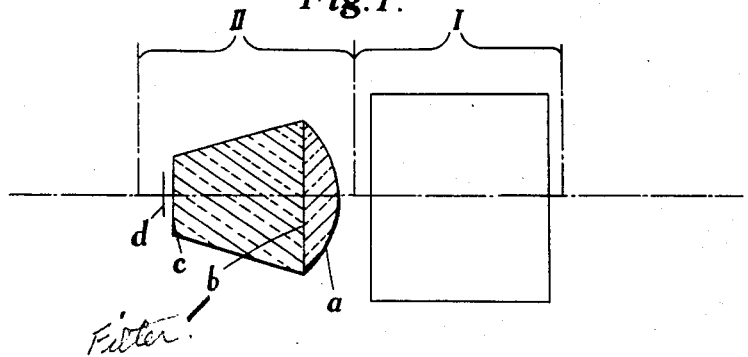
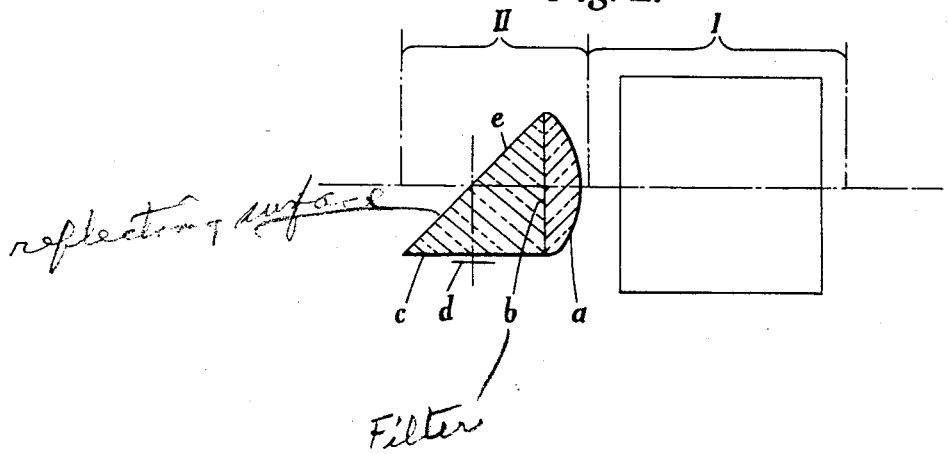
INVENTOR
BENJAMIN ELLAN LUBOSHEZ
BY
ATTORNEY Patented Mar. 27, 1934

1,952,268

UNITED STATES PATENT OFFICE 1,952,268

PHOTOGRAPHIC OBJECTIVE LENS

Benjamin Ellan Luboshez, Harrow, England

Application August 11, 1930, Serial No. 474,514
In Great Britain August 14, 1929

3 Claims. (Cl. 88—57)

The present invention relates to the particular shape of the rearmost lens in a compound photographic objective, more particularly the type of objective shown in my co-pending application Serial No. 358,643, filed April 27, 1929, and which has become Patent No. 1,910,115, dated May 23, 1933.

Where the rearmost lens in said specification is a cemented doublet, the rear lens of this pair is, according to this invention, made of exceptional thickness and its surfaces are either plane or of long positive or negative radius. The total thickness of the lens is at least half the opening, and is generally considerably more. A doublet form with a thick second section (which may, as said, be "plano-plano") will generally be used as the entire rear component in my said specification, for example in place of the rear component shown in Fig. 2 thereof.

Fig. 1 of the accompanying drawing shows a photographic objective lens of two components with a thick rear component II such as described, I representing the front component diagrammatically. For a rear component suitable for use with a front component of f/1.5 aperture converging a cone of rays to a point 100 mm. behind the surface a, which surface occupies the aplanatic position with regard to the cone, suitable optical data are as follows:—

Single thick cemented doublet chromatically corrected.

Crown lens leading.

1st surface (a) radius_____ 40.035
Glass thickness (Crown)_____ 15.000
2nd surface (b) (cemented)_____ plane
Glass thickness (Flint)_____ 51.583
3rd surface (c)_____ plane Focal plane at position d.

Glasses used: (Parra-Mantois List).

Crown No. D.52_____ $N_c$—1.4954
$N_d$—1.4977
$N_r$—1.5030
Flint No. C.916_____ $N_c$—1.6004
$N_d$—1.6049
$N_r$—1.6162

All dimensions given in mm.; final resultant aperture f/0.67.

An advantage accruing from the use of a thick lens as described is that this lens may be formed as a reflecting prism, and this formation of the rearmost lens in a photographic objective is a feature of the present invention. This is shown in Fig. 2, for which the same optical data may apply as for Fig. 1. Such a prism can, for small apertures, be totally reflecting, but for larger apertures some of the outer rays meet the reflecting surface e of the prism at angles less than the critical angle, in which case silvering on this surface of the prism becomes necessary. A light filter may be incorporated in a doublet lens as above described, being cemented at b between the sections. This enables a saving of light to be effected, as the loss by reflection at additional surfaces for the filter is avoided. When the lens is used only for colour photography, (where the exceptional apertures attained in a combination as in my said specification are of special advantage) the permanent insertion of the filter is no inconvenience. Alternatively the lens may be divided elsewhere and the filter cemented between.

What I claim as my invention and desire to secure by Letters Patent is:—

1. A rear component for a photographic objective lens consisting of a single cemented chromatically corrected doublet lens having the leading lens plano-convex and the rear lens plano-plano of a thickness not less than half the diameter.

2. A rear component for a photographic objective lens consisting of a single cemented chromatically corrected doublet lens having a substantially plano-plano rear portion of considerable thickness and a leading portion with a convex surface facing the incident light.

3. A positive rear component with a convex front surface for association with a fully corrected photographic objective, consisting of a cemented doublet of optically differing glass having a substantially planoplane back part of an appreciably greater thickness than the distance from its rear surface to the resultant image plane and a plano-convex front part of such curvature that when placed aplanatically with respect to the incident cone of rays from said obective a chromatically corrected image is formed in the air close behind the rearmost surface.

BENJAMIN ELLAN LUBOSHEZ.